United States Patent
Ogasawara (10) Patent No.: US 10,044,910 B2
(45) Date of Patent: Aug. 7, 2018

(54) IMAGE READING APPARATUS AND IMAGE READING METHOD THAT REDUCE ERROR IN COLOR REPRODUCTION DUE TO VARIATION IN LIGHT SOURCE UNIT, AND RECORDING MEDIUM THEREFOR

(71) Applicant: Kyocera Document Solutions Inc., Osaka (JP)

(72) Inventor: Reiko Ogasawara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 82 days.

(21) Appl. No.: 15/247,945

(22) Filed: Aug. 26, 2016

(65) Prior Publication Data

US 2017/0064149 A1   Mar. 2, 2017

(30) Foreign Application Priority Data

Aug. 27, 2015   (JP) .................................. 2015-168374

(51) Int. Cl.
*H04N 1/60* (2006.01)
*H04N 1/028* (2006.01)

(52) U.S. Cl.
CPC ......... *H04N 1/6044* (2013.01); *H04N 1/0281* (2013.01); *H04N 1/02815* (2013.01); *H04N 1/6008* (2013.01); *H04N 1/6033* (2013.01); *H04N 2201/0091* (2013.01)

(58) Field of Classification Search
None
See application file for complete search history.

(56) References Cited

U.S. PATENT DOCUMENTS 5,963,756 A * 10/1999 Sakai ..................... G03G 15/01
                                                                 399/39

FOREIGN PATENT DOCUMENTS

| JP | 2004-021164 A | 1/2004 |
| JP | 2005-039364 A | 2/2005 |
| JP | 2008-141532 A | 6/2008 |
| JP | 2013-243593 A | 12/2013 |

OTHER PUBLICATIONS

Machine translation of Japanese Pat. Publ. No. 2005-039364, published on Feb. 10, 2005.*
Machine translation of Japanese Pat. Publ. No. 2004-021164, published on Jan. 22, 2004.*

* cited by examiner

*Primary Examiner* — Paul F Payer
(74) *Attorney, Agent, or Firm* — James Judge (57) ABSTRACT

An image reading apparatus includes a light source unit and an image reading unit. The light source unit radiates white light containing a light having a first spectrum and a light having a second spectrum. The image reading unit generates image data in accordance with light reflected from the original document. The reflected light contains the light having the first spectrum and the light having the second spectrum. The image reading unit determines a correction value for calibrating a light amount of the light having the first spectrum as a ratio of a calibration reference value to a reflection light amount of the light having the first spectrum from a calibration document advance-prepared for calibration of the light having the second spectrum. The calibration reference value is set as a reference reflection light amount of the light having the first spectrum.

5 Claims, 8 Drawing Sheets

IMAGE READING APPARATUS AND IMAGE READING METHOD THAT REDUCE ERROR IN COLOR REPRODUCTION DUE TO VARIATION IN LIGHT SOURCE UNIT, AND RECORDING MEDIUM THEREFOR

INCORPORATION BY REFERENCE

This application is based upon, and claims the benefit of priority from, corresponding Japanese Patent Application No. 2015-168374 filed in the Japan Patent Office on Aug. 27, 2015, the entire contents of which are incorporated herein by reference.

BACKGROUND

Unless otherwise indicated herein, the description in this section is not prior art to the claims in this application and is not admitted to be prior art by inclusion in this section.

There is proposed a technique that prints color patches and detects the printed color patches with a sensor to calibrate its image formation process, thus ensuring accurate color reproduction. There is proposed a facilitated technique of a color sensor calibration. The color sensor calibration is executed for reducing change in output due to a secular change of a light emitting portion and a light receiving portion, which constitute a color sensor, and due to a change in temperature in a peripheral area, and reducing an influence of a reduced sensor output due to a stain on the sensor surface. There is additionally proposed a technique that selectively lights light sources whose number is less than the number of colors to be detected, thus ensuring the reduced number of light emitting sources and light receiving sensors.

SUMMARY

An image reading apparatus according to one aspect of the disclosure reads an image on an original document. The image reading apparatus includes a light source unit and an image reading unit. The light source unit includes a first light source and a second light source. The first light source emits a light having a first spectrum. The second light source emits a light having a second spectrum. The light source unit radiates white light containing the light having the first spectrum and the light having the second spectrum. The image reading unit generates image data in accordance with light reflected from the original document. The reflected light contains the light having the first spectrum and the light having the second spectrum. The image reading unit determines a correction value for calibrating a light amount of the light having the first spectrum as a ratio of a calibration reference value to a reflection light amount of the light having the first spectrum from a calibration document advance-prepared for calibration of the light having the second spectrum, the calibration reference value being set as a reference reflection light amount of the light having the first spectrum.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as "embodiment") with reference to the drawings.

Figure 1:
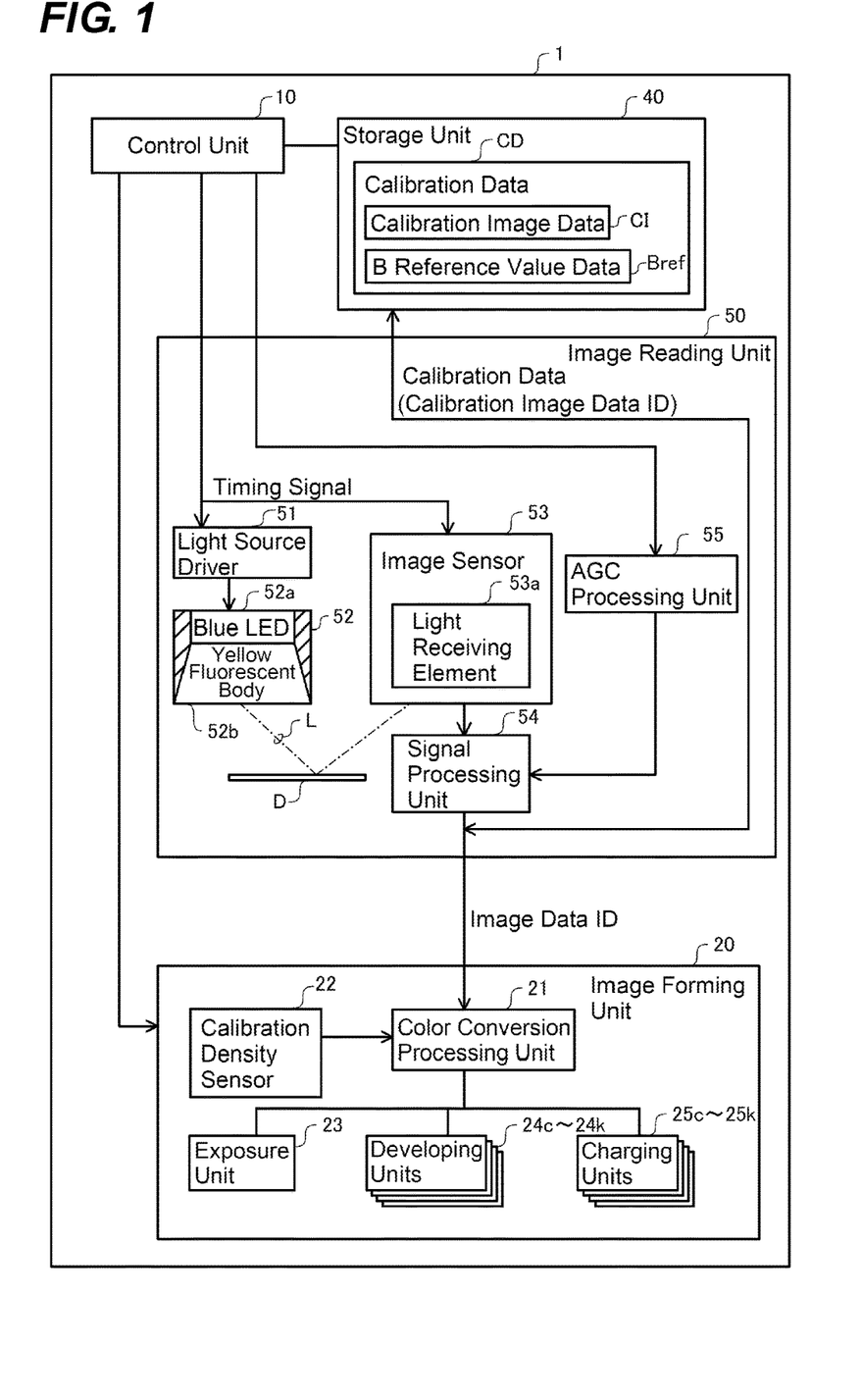
FIG. 1 illustrates a schematic configuration of an overall configuration of an image forming apparatus according to one embodiment of the disclosure.

FIG. 1 illustrates a functional configuration of an image forming apparatus 1 according to one embodiment of the disclosure. The image forming apparatus 1 includes a control unit 10, an image forming unit 20, a storage unit 40, and an image reading unit 50.

The control unit 10 includes a main storage unit, such as a RAM and a ROM, and a control unit, such as a microprocessing unit (MPU) and a central processing unit (CPU). The control unit 10 has a controller function related to an interface, such as various I/Os, a universal serial bus (USB), a bus, and another hardware, and controls the whole image forming apparatus 1.

The storage unit 40 is a storage device that is constituted of, for example, a hard disk drive and a flash memory, which are non-transitory recording media, and stores a program that controls processing executed by the control unit 10, and data. In the embodiment, the storage unit 40 further stores calibration image data CI and B reference value data Bref as calibration data CD for printing an adjustment document for CMYK calibration. The storage unit 40 stores the calibration image data CI as RGB data.

The image reading unit 50 reads an image from an original document to generate image data ID as digital data. The image reading unit 50 includes a light source driver 51 and a light source unit 52. The light source unit 52 includes a plurality of LEDs (not illustrated) that irradiate an original document D with a light. The light source driver 51 is an LED driver that drives the plurality of the LEDs arranged in a main-scanning direction, and executes an on and off drive control of the light source unit 52.

The light source unit 52 is a white light source including a blue LED 52a and a yellow fluorescent body 52b. The blue LED 52a functions as a light source for a blue light among three primary colors. The yellow fluorescent body 52b is a fluorescent body, which is irradiated with the blue light by the blue LED 52a to function as a light source, for emitting a red light and a green light. This causes the light source unit 52 to emit the red light, the green light, and the blue light, and consequently function as the white light source (white LED).

The present inventor, however, have found that a brightness and a spectrum of the blue light emitted by the white LED are varied depending on its chromaticity rank (variation in color). In other words, the present inventor have found that while variation in spectrums of the red light and the green light, which are emitted as the photoluminescence by the fluorescent body, is small, the spectrum of the blue light are relatively and significantly varied compared with the small change in spectrums of the red light and the green light. It is inferred that this is due to the configuration of the above-described white LED. In the embodiment, the storage unit 40 stores the B reference value data Bref, which is a calibration reference value for the blue light.

An image sensor 53 is a line sensor including a plurality of light receiving elements 53a arranged in the main-scanning direction. The plurality of the light receiving elements 53a generate photoelectrically-converted electric charges in accordance with strength and weakness of respective incident lights, and transfer the electric charges using an analog shift register (not illustrated). The transferred respective electric charges are converted to an analog electrical signal as a voltage signal by an electric charge-voltage conversion amplifier. This causes the image sensor 53 to output an analog electrical signal for each of pixels in the main-scanning direction.

The image reading unit 50 further includes a signal processing unit 54, an AGC processing unit 55, and a white reference board (not illustrated). The signal processing unit 54 amplifies the analog electrical signal using a gain, which is set by the AGC processing unit 55 and stored in the storage unit 40. The signal processing unit 54 performs an A/D conversion on the amplified analog electrical signal to generate image data ID as digital data. The image forming unit 20, as described above, forms an image on a print medium based on the image data ID, and then discharges the print medium. The image data ID is data having a range, which has the minimum value "0" and the maximum value "255."

In the embodiment, the AGC processing unit 55 is a gain adjustment unit that sets an appropriate gain and offset value for each of the plurality of light receiving elements 53a using a black reference signal and a white reference signal. The black reference signal is an analog electrical signal of the light receiving element 53a in a state where the light source unit 52 is turned off. The white reference signal is an analog electrical signal of the light receiving element 53a when the white reference board (not illustrated) is irradiated instead of the original document D. The AGC processing unit 55 sets the offset value such that a value of the image data ID of the A/D-converted black reference signal is the minimum value "0." The AGC processing unit 55 sets the gain such that a value of the image data ID of the A/D-converted white reference signal is the maximum value "255" using this offset value.

This ensures an effective use of the range from the minimum value "0" to the maximum value "255" of image data ID corresponding to change in the analog electrical signal due to increase/decrease of the reflected light between the black reference signal and the white reference signal. However, when there is a variation in RGB brightness of the light source unit 52 due to an individual difference of the light source unit 52, even if an original document has, for example, the identical RGB tones, the detected RGB tones may not be identical. Specifically, this is because a reflection light amount of B increases when a light amount of B of the light source unit 52 is larger than light amounts of R or G of the light source unit 52, even if the RGB tones of the original document are identical.

The image forming unit 20 includes a color conversion processing unit 21, a calibration print density sensor 22, an exposure unit 23, developing units 24c to 24k, and charging units 25c to 25k. The color conversion processing unit 21 performs a color conversion on the image data ID as the RGB data into CMYK, and a halftone process to generate CMYK halftone data.

Figure 2:
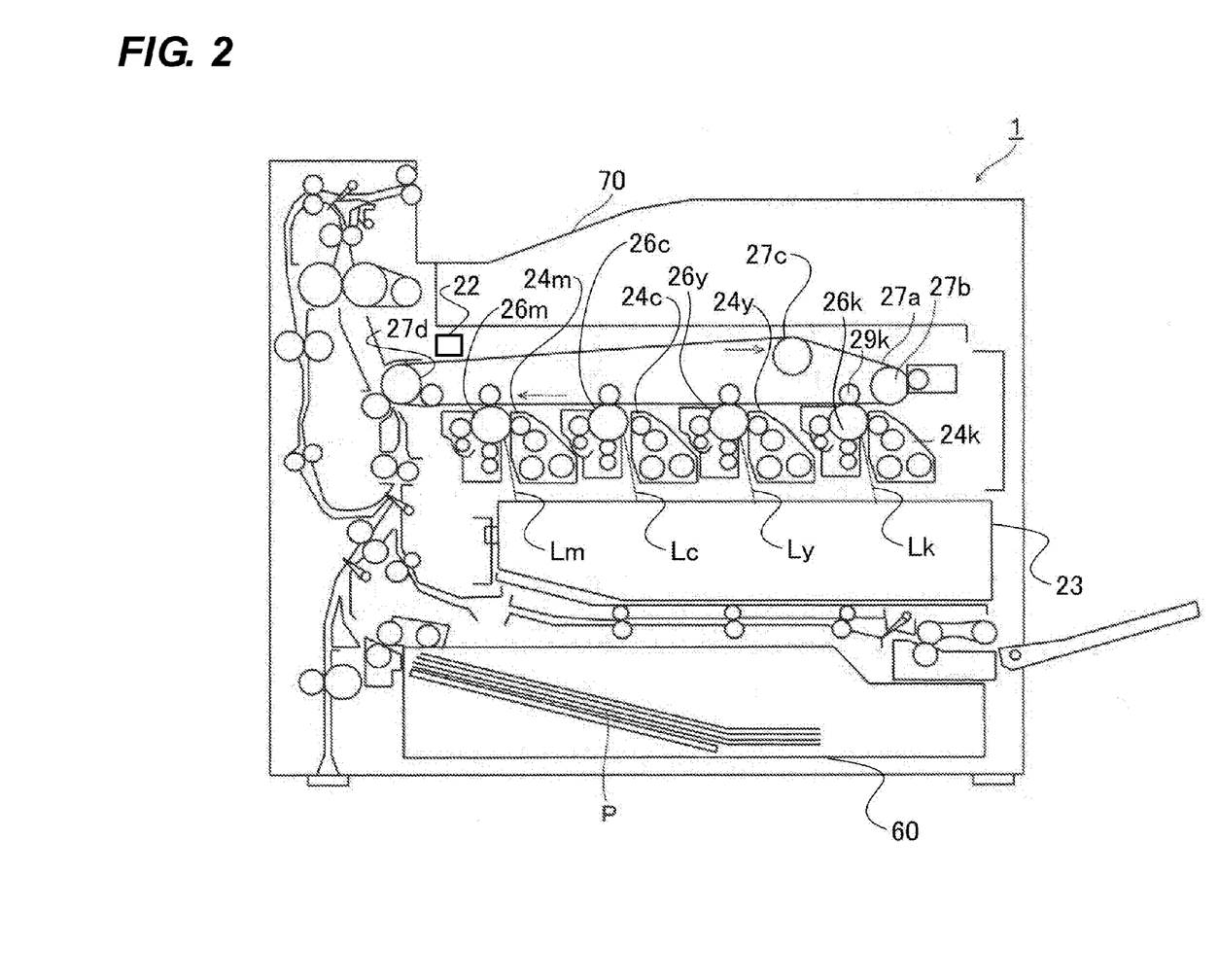
FIG. 2 illustrates a cross section of the overall configuration of the image forming apparatus according to the one embodiment.

FIG. 2 illustrates a cross section of an overall configuration of the image forming apparatus 1 according to the one embodiment of the disclosure. The image forming apparatus 1 of the embodiment is a tandem type color printer. The image forming apparatus 1 includes a housing 70 inside which photoreceptor drums (image carriers) 26m, 26c, 26y, and 26k are arranged in one row corresponding to respective colors of magenta, cyan, yellow, and black. The developing units 24m, 24c, 24y, and 24k are arranged adjacent to the photoreceptor drums 26m, 26c, 26y, and 26k, respectively.

The exposure unit 23 irradiates the photoreceptor drums 26m, 26c, 26y, and 26k with laser beams Lm, Lc, Ly, and Lk for the respective colors. This irradiation forms electrostatic latent images on the photoreceptor drums 26m, 26c, 26y, and 26k. The developing units 24m, 24c, 24y, and 24k attach toners to the electrostatic latent images formed on the surfaces of the photoreceptor drums 26m, 26c, 26y, and 26k while stirring the toners. This completes the development process, thus ensuring the formed toner images of the respective colors on the surfaces of the photoreceptor drums 26m, 26c, 26y, and 26k.

The image forming apparatus 1 includes an endless intermediate transfer belt 27a. The intermediate transfer belt 27a is stretched by a tension roller 27c, a drive roller 27b, and a driven roller 27d. The intermediate transfer belt 27a is circularly driven by a rotation of the drive roller 27b.

For example, the photoreceptor drum 26k and a primary transfer roller 29k sandwich the intermediate transfer belt 27a, and then the intermediate transfer belt 27a is circularly driven. This causes a black toner image on the photoreceptor drum 26k to be primarily transferred onto the intermediate transfer belt 27a. The same applies to the other three colors of cyan, yellow, and black. The intermediate transfer belt 27a has the surface on which the primary transfers are performed and mutually superimposed at predetermined timings, and then a full-color toner image is formed. After that, the full-color toner image is secondarily transferred to a printing paper sheet P supplied from a sheet feed cassette 60, and is fixed on the printing paper sheet P by a well-known fixing process.

Figure 3:
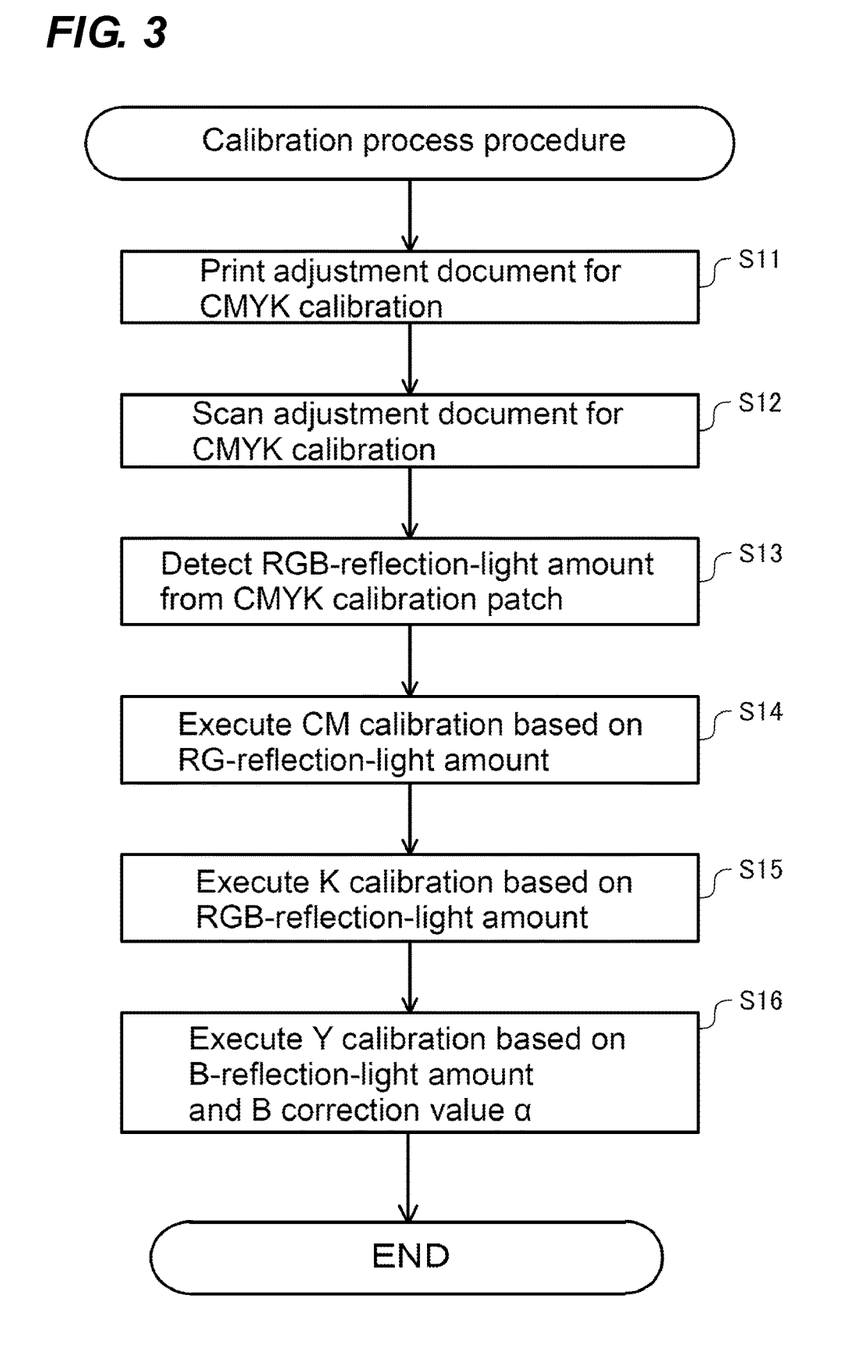
FIG. 3 illustrates contents of a calibration process procedure of the image forming apparatus according to the one embodiment.

FIG. 3 illustrates contents of a calibration process procedure of the image forming apparatus 1 according to the one embodiment. At Step S11, a user prints an adjustment document for CMYK calibration using the image forming apparatus 1. In the embodiment, the adjustment document for CMYK calibration is an original document to be printed using the calibration image data CI (that is, RGB data for calibration) read from the storage unit 40. The RGB data for calibration includes R tone data for C calibration, G tone data for M calibration, B tone data for Y calibration, and RGB (gray) tone data for K calibration. Printing of the adjustment document for CMYK calibration is executed using a user interface for execution included in a preliminarily-set calibration menu (not illustrated).

The R tone data for C calibration is data for printing a plurality of patches representing respective tones of R. The G tone data for M calibration, the B tone data for Y calibration, and the RGB (gray) tone data for K calibration are data for printing a plurality of patches representing respective tones of MYK, respectively. The RGB data for calibration is configured to print all patches on a preliminarily-set one print medium using these pieces of data. Thus, the image forming apparatus 1 outputs the adjustment document for CMYK calibration based on the calibration image data CI (the RGB data for calibration).

At Step S12, the user causes the image reading unit 50 in the image forming apparatus 1 to scan the adjustment document for CMYK calibration. The image reading unit 50 reads an image of the adjustment document for CMYK calibration to generate print image data for calibration as digital data. The print image data for calibration is generated as RGB image data based on absorbance properties of the RGB lights at the adjustment document for CMYK calibration. The print image data for calibration may be generated using the calibration print density sensor 22 after the patches are formed on the intermediate transfer belt 27a.

At Step S13, the image forming apparatus 1 detects the RGB-reflection-light amounts based on the print image data for calibration. The RGB-reflection-light amounts correspond to the tone values of print image data RGB for calibration. Specifically, the RGB-reflection-light amounts correspond to light absorption levels Ar (corresponding to tone value of R) of the red light in patches of respective tones of a known cyan adjustment document, light absorption levels Ag (corresponding to tone value of G) of the green light in patches of respective tones of a known magenta adjustment document, light absorption levels Ab (corresponding to tone value of B) of the blue light in patches of respective tones of a known yellow adjustment document, and light absorption levels of RGB (tone values of RGB) in patches of respective tones of a known gray adjustment document.

Figure 4A:
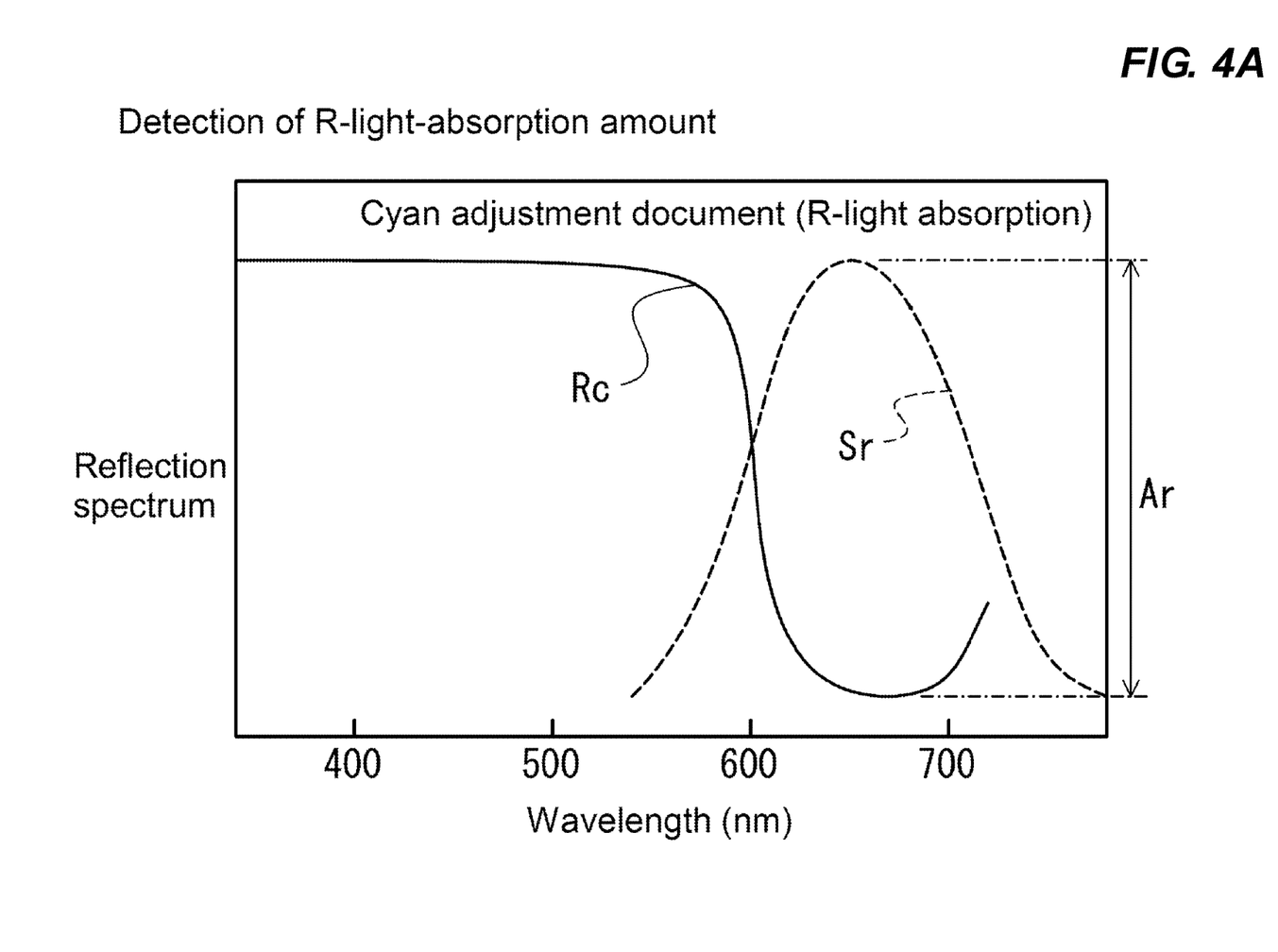
FIG. 4A illustrates a relation between a frequency characteristic of a cyan calibration patch according to the one embodiment and a frequency band of a red light.
Figure 4B:
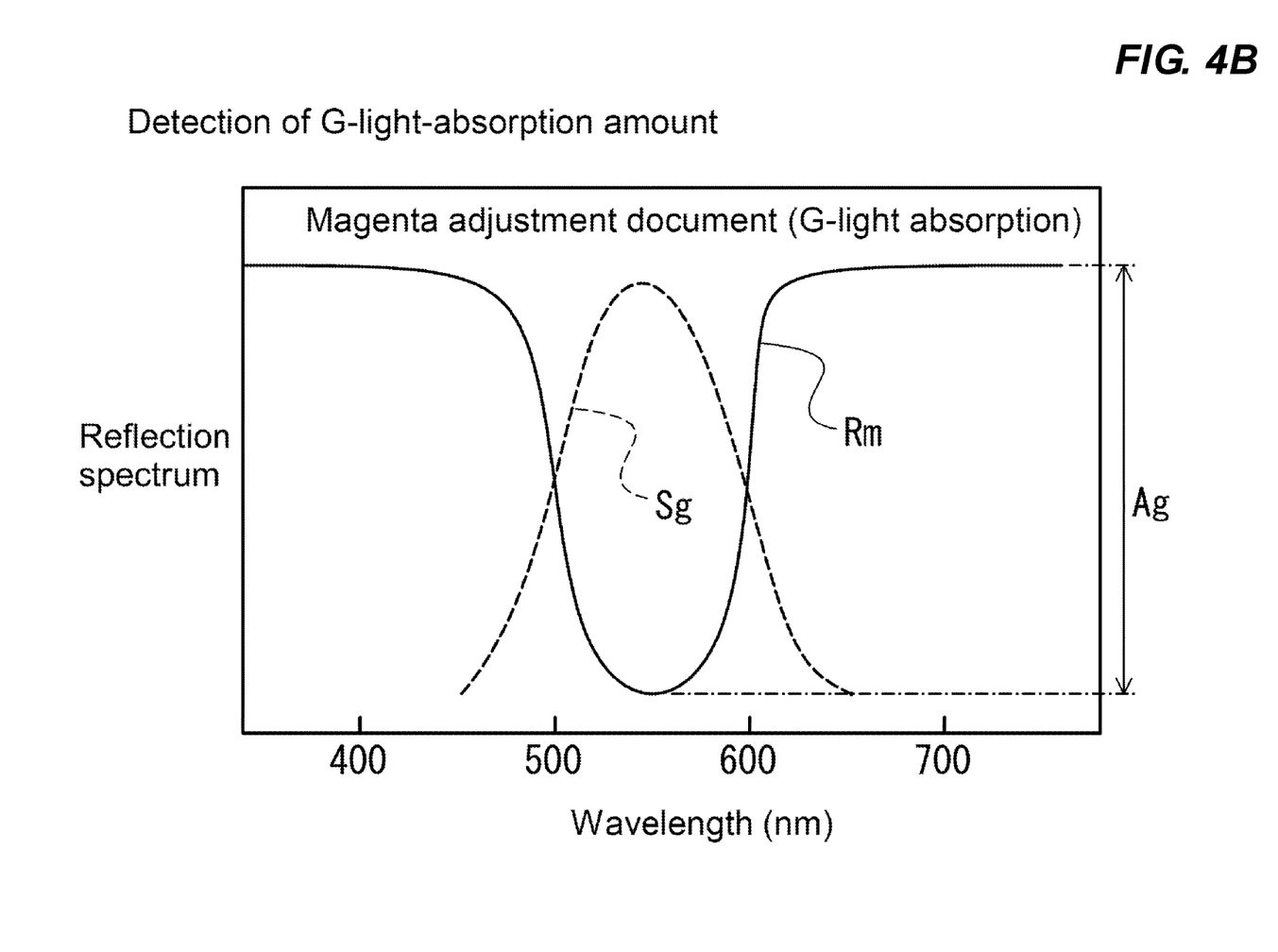
FIG. 4B illustrates a relation between a frequency characteristic of a magenta calibration patch according to the one embodiment and a frequency band of a green light.

FIG. 4A illustrates a relation between a frequency characteristic of a cyan calibration patch according to the one embodiment and a frequency band of a red light. FIG. 4B illustrates a relation between a frequency characteristic of a magenta calibration patch according to the one embodiment and a frequency band of a green light. The horizontal axis indicates an optical wavelength. The vertical axis indicates a reflection light amount.

FIG. 4A indicates an exemplary reflection spectrum Rc of the cyan calibration patch (also referred to as a C calibration patch) of the cyan adjustment document, and an exemplary absorption spectrum Sr of the cyan calibration patch. The light absorption level Ar indicates a light amount absorbed by the cyan calibration patch of the cyan adjustment document, that is, the peak value of a non-reflected light amount. The light absorption level Ar becomes the peak in a red-light-wavelength band.

FIG. 4B indicates a reflection spectrum Rg of a magenta calibration patch (also referred to as an M calibration patch) of the magenta adjustment document, and an exemplary absorption spectrum Sg of the magenta calibration patch. The light absorption level Ag indicates a light amount absorbed by the magenta calibration patch (also referred to as an M calibration patch) of the magenta adjustment document, that is, the peak value of a non-reflected light amount. The light absorption level Ag becomes the peak in a green-light-wavelength band.

The light absorption level Ar of the red light (FIG. 4A) is detected by the image sensor 53. A comparison result of a relation between the tones of the cyan calibration patches and the light absorption levels Ar of the red light is used for a calibration executed by the image forming unit 20. The light absorption level Ag of the green light (FIG. 4B) is detected by the image sensor 53. A comparison result of a relation between the tones of the magenta calibration patches and the light absorption levels Ag of the green light is used for the calibration executed by the image forming unit 20. Specifically, the tones of cyan correspond to area rates of cyan dot. The higher the tone of cyan becomes, the higher the area rate of the cyan dot becomes. That is, the higher the tone of cyan becomes, the more the cyan dots absorb the red light, thus causing the light absorption level Ar of the red light to become large. The same applies to the tone of magenta.

At Step S14, the image forming apparatus 1 executes a CM calibration based on the RG-reflection-light amounts. In the embodiment, the CM calibration is executed as calibrations of dot area rates of cyan toner and magenta toner in a halftone process. Specifically, for example, assume that the detection results of the light absorption levels Ar of patches formed using R tone data for C calibration are larger than the set light absorption levels as the known light absorption levels, which are preliminarily set, that is, the area rate of cyan dot is high. The area rate of the cyan dot is calibrated to reduce the area rate of cyan dot such that the light absorption levels Ar approach the set light absorption levels. This ensures the calibration such that the scan result of the actually-formed print image approaches the RGB data for calibration in the image forming apparatus 1.

At Step S15, the image forming apparatus 1 executes a K calibration based on the RGB-reflection-light amounts. In the embodiment, the K calibration is executed as a calibration of dot area rate of gray patch caused by black toner in the halftone process. Specifically, for example, assume that the detection results of the light absorption levels of patches (not illustrated) formed using K tone data for K calibration are larger than the set light absorption levels as the known light absorption levels, which are preliminarily set, that is, the area rate of black dot is high. The area rate of black dot is calibrated to reduce the area rate of black dot such that the light absorption levels approach the set light absorption levels.

At Step S16, the image forming apparatus 1 executes a Y calibration based on the B-reflection-light amounts. In the embodiment, the Y calibration is executed as a calibration of dot area rate of yellow toner in the halftone process. The basic method of the Y calibration is identical to the CM calibration (Step S14) based on the RG-reflection-light amounts. However, the Y calibration is different from the CM calibration (Step S14) based on the RG-reflection-light amounts in that the B tone data for Y calibration (corresponding to a detection result of the light absorption levels Ab of patches) is corrected using a B-correction-value a obtained by the following method.

Figure 5A:
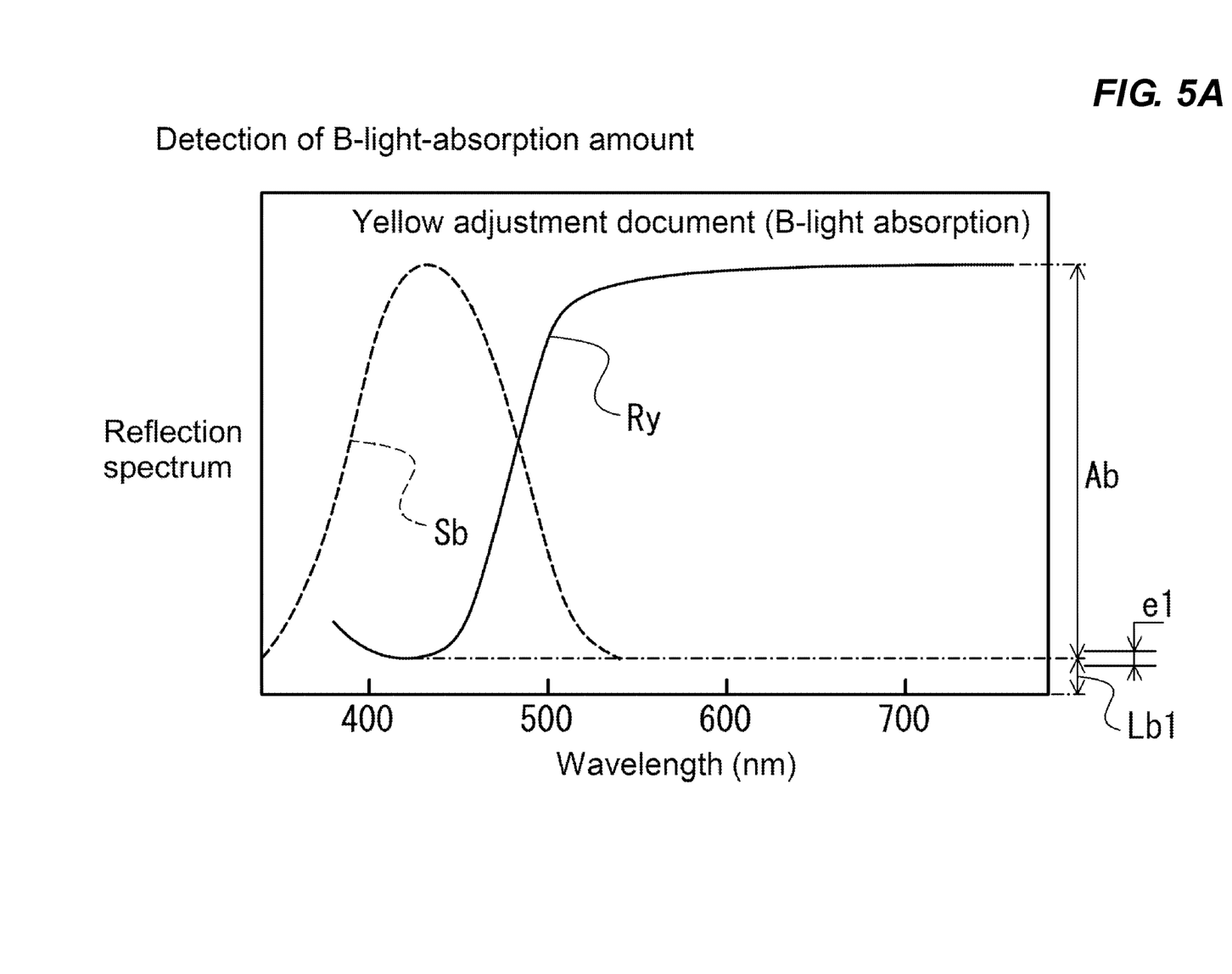
FIG. 5A illustrates a relation between a yellow calibration patch according to the one embodiment and a frequency band of a blue light.
Figure 5B:
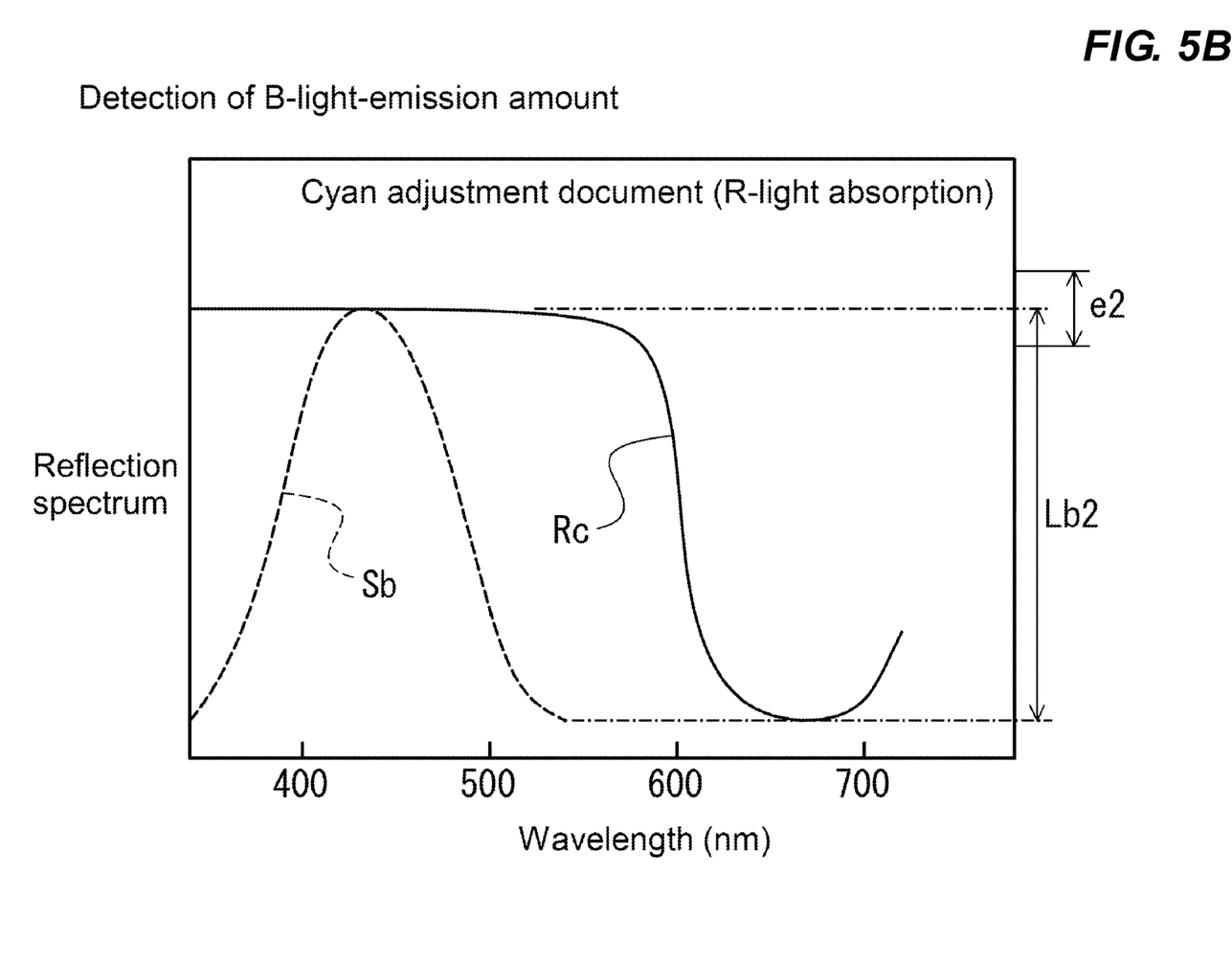
FIG. 5B illustrates a relation between a cyan calibration patch according to the one embodiment and the frequency band of the blue light.

FIG. 5A illustrates a relation between a yellow calibration patch according to the one embodiment and a frequency band of a blue light. FIG. 5B illustrates a relation between a cyan calibration patch according to the one embodiment and the frequency band of the blue light. FIG. 5A indicates an exemplary reflection spectrum Ry of the yellow calibration patch (also referred to as a Y calibration patch) of the yellow adjustment document, and an exemplary absorption spectrum Sb of the yellow calibration patch. The light absorption level Ab indicates a light amount absorbed by the yellow calibration patch of the yellow adjustment document, that is, the peak value of a non-reflected light amount. The light absorption level Ab becomes the peak in a blue-light-wavelength band.

FIG. 5B indicates an exemplary reflection spectrum Rc of the cyan calibration patch of the cyan adjustment document, and an exemplary absorption spectrum Sb of the yellow calibration patch. That is, FIG. 5B is a graph indicating a relation between the reflection spectrum Rc of the cyan calibration patch (FIG. 4A), and the absorption spectrum Sb of the yellow calibration patch (FIG. 5A). According to the reflection spectrum Rc of the cyan calibration patch, the blue light in a wavelength range of 400 nm to 500 nm is hardly absorbed, and is reflected.

Figure 6:
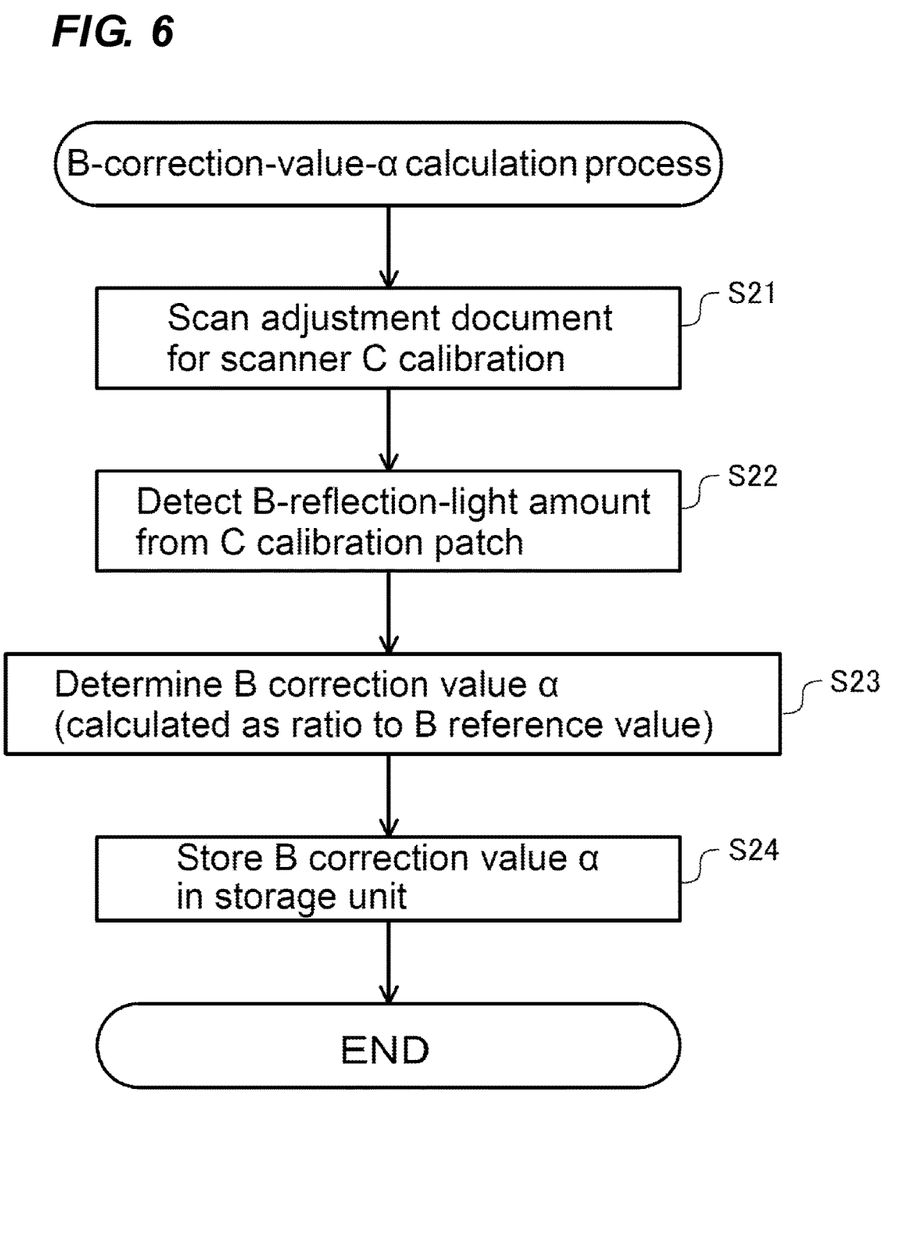
FIG. 6 illustrates contents of a B-correction-value-a calculation process according to the one embodiment.

FIG. 6 illustrates contents of a B-correction-value-α calculation process according to the one embodiment. At Step S21, the user causes an adjustment document for scanner C calibration to be scan. The image forming apparatus 1 includes an adjustment document for scanner CMYK calibration, the calibration is executed similarly to the image forming unit 20. However, the B-correction-value-α calculation process is different from a typical scanner calibration in that the B-correction-value-α calculation process detects a variation in a blue light amount of the light source unit 52 as the white light source using the adjustment document for scanner C calibration for use of the cyan (the red light) calibration. The adjustment document for scanner C calibration is an exemplary patch advance-prepared for calibration of a light having a second spectrum.

At Step S22, the image reading unit 50 detects the B-reflection-light amount from the C calibration patch of the adjustment document for scanner C calibration. The adjustment document for scanner C calibration, which is used for a calibration of the red light, is used for a detection of the B-reflection-light amount because the adjustment document for scanner C calibration reflects the blue light nearly without absorbing the blue light due to a large difference between a wavelength of the red light and a wavelength of the blue light.

Specifically, for example, assuming that a B-reflection-light amount Lb1, which is from the Y calibration patch of an adjustment document for scanner Y calibration, is detected (FIG. 5A), the Y calibration patch absorbs the blue light. This reduces a variation detection amount e1 of the B-reflection-light amount Lb1. In contrast, the embodiment detects the B-reflection-light amount Lb1 from the C calibration patch (FIG. 5B). This increases a variation detection amount e2 of a B-reflection-light amount Lb2 while the C calibration patch does not absorb the blue light. Thus, the variation in the blue light amount of the light source unit 52, which is the white light source, is detected with high accuracy.

At Step S23, the control unit 10 determines a B correction value α. The B correction value a is calculated as a ratio of the B reference value data Bref, which is read from the storage unit 40 by the control unit 10, to a tone value RGB_Bc value corresponding to the B-reflection-light amount. The B reference value data Bref is a light amount to be detected when the blue light amount of the light source unit 52 has the reference value. Specifically, the B correction value a is determined as a value where the B reference value data Bref is divided by the tone value RGB_Bc (α=Bref/RGB_Bc).

At Step S24, the control unit 10 causes the storage unit 40 to store the B correction value α. The B correction value α is a ratio of a tone value to be detected when the blue light amount of the light source unit 52 has the reference value to an actually-detected tone value. Specifically, for example, assume that an RGB_Bc value, which is an actual detection amount, is 1/1.2 of the tone value to be detected when the blue light amount of the light source unit 52 has the reference value, the B correction value α is 1.2 (α=1/(1/1.2)). Use of this B correction value α ensures an estimation of a light amount in a case where the blue light amount of the light source unit 52 has the reference value even if the blue light amount of the light source unit 52 is varied from the reference value.

Thus, the image forming apparatus 1 according to the embodiment ensures the reduced reading error (error in color reproduction) due to the variation in the blue light of the white light source without providing new hardware.

The disclosure is not limited to the above-described embodiment and embodied as the following modifications.

Modification 1: While in the above-described embodiment the adjustment of the dot area rate performs the calibration, the calibration may be performed by an adjustment of, for example, exposure energy, a charging bias, or a developing bias. The variation in the RGB-light amounts of the light source unit may be calibrated by an AGC adjustment. However, the calibration in the image formation process is advantageous in that the calibration does not cause a narrow RGB dynamic range for image reading.

Modification 2: While in the above-described embodiment the white light source unit includes a blue light LED (also referred to as a light source) and a yellow fluorescent body, the white light source unit is not limited to this configuration. The blue light LED emits a light having a first spectrum. The yellow fluorescent body emits a light having a second spectrum due to excitation by the light having the first spectrum.

Modification 3: While in the above-described embodiment the image reading unit employs a CCD method, the disclosure is not limited to the CCD method, and another method such as a CIS method may be employed. The CIS method typically uses respective light sources of RGB. Thus, the disclosure may be applied to reduce a variation in the respective light sources of RGB. In this case, the white light source unit consequently includes a light source that emits a light having a first spectrum, a light source that emits a light having a second spectrum, and a light source that emits a light with a third spectrum.

Furthermore, it is not necessary that the white light source unit is constituted of three light sources of RGB. The white light source unit may include, for example, a combination of a light source for blue and a light source for yellow (an RG spectrum), a combination of a light source for red and a light source for blue-green (a GB spectrum), or a combination of a light source for green and a light source for purple (an RB spectrum).

The white light source unit may have any configuration insofar as the white light source unit includes a first light source and a second light source to radiate white light. The first light source emits a light having a first spectrum. The second light source emits a light having a second spectrum. The white light has the light having the first spectrum and the light having the second spectrum. Furthermore, as the above-described embodiment, the second light source may be a fluorescent body that emits the light having the second spectrum due to excitation by the light having the first spectrum.

Modification 4: While in the above-described embodiment an adjustment document for scanner C calibration is used as one example of a patch advance-prepared for calibration of a light having a second spectrum, an adjustment document for M scanner calibration may be used. However, the use of the adjustment document for scanner C calibration having the low absorbance in the blue light band is preferred compared with the use of the adjustment document for M scanner calibration.

Modification 5: While in the above-described embodiment the disclosure is applied to the image forming apparatus, the disclosure is also applicable to another image reading apparatus such as a dedicated scanner.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus for reading images on an original document, the apparatus comprising:
   a light source unit including a blue light LED emitting light having a first spectrum, and a yellow fluorescent body emitting light having a second spectrum under excitation by the light having the first spectrum, the light source unit radiating white light containing the light having the first spectrum and the light having the second spectrum; and
   an image reading unit that generates image data in accordance with light reflected from the original document, the reflected light containing the light having the first spectrum and the light having the second spectrum; wherein
   the image reading unit determines a correction value for calibrating a light amount of the light having the first spectrum as a ratio of a calibration reference value to a reflection light amount of the light having the first spectrum from a calibration document advance-prepared for calibration of the light having the second spectrum, the calibration reference value being set as a reference reflection light amount of the light having the first spectrum.

2. The image reading apparatus according to claim 1, wherein the calibration document advance-prepared for calibration of the light having the second spectrum is a cyan-calibration document.

3. An image forming apparatus comprising:
   the image reading apparatus according to claim 1; and
   an image forming unit that forms an image based on the image data; wherein
   the image forming unit uses the correction value to calibrate image data generated in accordance with the reflected light of the light having the first spectrum using the correction value among the image data.

4. An image reading method for reading images on an original document, the method comprising:
   radiating white light containing light having a first spectrum and light having the second spectrum using a blue light LED emitting the light having the first spectrum and a yellow fluorescent body emitting the light having the second spectrum under excitation by the light having the first spectrum; and
   generating image data in accordance with light reflected from the original document, the reflected light containing the light having the first spectrum and the light having the second spectrum; wherein
   the generating includes determining a correction value for calibrating a light amount of the light having the first spectrum as a ratio of a calibration reference value to a reflection light amount of the light having the first spectrum from a calibration document advance-prepared for calibration of the light having the second spectrum, the calibration reference value being set as a reference reflection light amount of the light having the first spectrum.

5. A non-transitory computer-readable recording medium storing a control program for controlling an image reading apparatus that reads images on an original document using a light source unit including a blue light LED emitting light having a first spectrum, and a yellow fluorescent body emitting light having a second spectrum under excitation by the light having the first spectrum, the light source unit radiating white light containing the light having the first spectrum and the light having the second spectrum, the control program causing the image reading apparatus to function as:
   an image reading unit that generates image data in accordance with light reflected from the original document, the reflected light containing the light having the first spectrum and the light having the second spectrum; wherein
   the image reading unit determines a correction value for calibrating a light amount of the light having the first spectrum as a ratio of a calibration reference value to a reflection light amount of the light having the first spectrum from a calibration document advance-prepared for calibration of the light having the second spectrum, the calibration reference value being set as a reference reflection light amount of the light having the first spectrum.

* * * * *